United States Patent
Chatterjee et al.

(10) Patent No.: US 7,096,213 B2
(45) Date of Patent: Aug. 22, 2006

(54) PERSISTENT KEY-VALUE REPOSITORY WITH A PLUGGABLE ARCHITECTURE TO ABSTRACT PHYSICAL STORAGE

(75) Inventors: Surojit Chatterjee, Foster City, CA (US); Raj Kumar, Brooklyn, NY (US); Jonathan Creighton, Oakland, CA (US); Alok K. Srivastava, Newark, CA (US); Sameer Joshi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 848 days.

(21) Appl. No.: 10/253,088

(22) Filed: Sep. 23, 2002

(65) Prior Publication Data

US 2003/0191739 A1    Oct. 9, 2003

Related U.S. Application Data

(60) Provisional application No. 60/372,186, filed on Apr. 12, 2002, provisional application No. 60/370,963, filed on Apr. 8, 2002.

(51) Int. Cl.
*G06F 17/30* (2006.01)

(52) U.S. Cl. ................ 707/2; 707/1; 707/102; 707/10; 711/113; 719/321; 719/328; 709/201

(58) Field of Classification Search ............... 707/102, 707/1, 2, 10; 711/113; 719/321, 328; 709/201
See application file for complete search history.

(56) References Cited

U.S. PATENT DOCUMENTS

| | | | |
|---|---|---|---|
| 4,817,091 A | 3/1989 | Katzman et al. | |
| 5,991,776 A | 11/1999 | Bennett et al. | ............. 707/205 |
| 6,016,499 A | 1/2000 | Ferguson | |
| 6,047,285 A | 4/2000 | Jacobs et al. | |
| 6,067,584 A | 5/2000 | Hayles et al. | |
| 6,105,025 A | 8/2000 | Jacobs et al. | |
| 6,292,795 B1 | 9/2001 | Peters et al. | .................... 707/3 |
| 6,327,594 B1 | 12/2001 | Van Huben et al. | |
| 6,345,382 B1 | 2/2002 | Hughes | |
| 6,421,662 B1 | 7/2002 | Karten | ........................ 707/3 |

OTHER PUBLICATIONS

International Preliminary Examining Authority, "Notification of Transmittal of the International Preliminary Examination Report," Jul. 13, 2004, 18 pages.

(Continued)

*Primary Examiner*—Hosain Alam
*Assistant Examiner*—Andrew Setlak
(74) *Attorney, Agent, or Firm*—Hickman Palermo Truong & Becker, LLP

(57) ABSTRACT

A system and techniques are described for managing key-value pairs using an architecture that does not restrict its users to any specific platform or storage subsystem. According to one aspect of the invention, the repository is portable in that the architecture need not change based on the environment and platform in which the repository is used. Rather, the portion of the architecture that is platform-specific is limited to plug-ins at a storage abstraction layer of the repository. The plug-ins expose the same storage abstraction interface to the other layers of the repository, but are implemented to interact with different platforms and storage subsystems. Consequently, in response to being ported from one platform to another, the repository may simply change the plug-in to invoke for persistent storage operations.

14 Claims, 2 Drawing Sheets

OTHER PUBLICATIONS

Current claims in PCT application, International Application No. PCT/US03/09407, 10 pages.

Oracle Corporation, "Oracle 8i Administrator's Guide," Release 2 (8.1.6) Dec. 1999, Part No. A76956-01, Chapter 16, 14 pages.

Compaq Computer Corporation, UNIX Software Division, "Cluster File System in Compaq *TruCluster* Server: Extending the advantages of single-system file systems to high availability clusters," Sep. 2001, pp. 1-13.

European Patent Office, "International Search Report," application No. 03716862.2—1527, dated Jun. 8, 2005, 7 pages.

Current Claims, application No. 03716862.2—1527, 10 pages.

Jim Gray et al., "Transaction Processing: Concepts and Techniques," 1993, pp. 556-558.

Werner Vogels et al., "The Design and Architecture of the Microsoft Cluster Service, A Practical Approach to High-Availability and Scalability," May 1997, Cornell University Dept. of CS Technical Report, number assignment in preparation, 10 pages.

Werner Vogels et al., "Scalability of the Microsoft Cluster Service," undated, 9 pages.

Gregory F. Pfister, "Second Edition, In Search of Clusters, The Ongoing Battle in Lowly Parallel Computing," 1995, Chapter 4, pp. 71-84.

Murthy Devarakonda et al., "Recovery in the Calypso File System," ACM Transactions on Computer Systems, vol. 14, No. 3, Aug. 1996, pp. 287-310.

Marshall Kirk McKusick et al., "A Fast File System for UNIX*," Revised Feb. 18, 1984, pp. 1-14.

Mendel Rosenblum et al., "The Design and Implementation of a Log-Structured File System," Jul. 24, 1991, pp. 1-15.

Gregory R. Ganger et al., "Embedded Inodes and Explicit Grouping: Exploiting Disk Bandwidth for Small Files," First appeared in the Proceedings of the USENIX Technical Conference, Jan. 1997, pp. 1-17.

Keith Smith et al., "File Layout and File System Performance," TR-35-94, undated, pp. 1-23.

Tatu Ylönen, "Shadow Paging Is Feasible," undated, pp. 1-15.

Tatu Ylönen, "Write Optimizations and Clustering in Concurrent Shadow Paging," undated, pp. 1-16.

Tatu Ylönen, "Concurrent Shadow Paging: A New Direction for Database Research," undated, pp. 1-7.

Hewlett-Packard Company, "The Gold Standard: Cluster File System in hp *TruCluster* Server, Extending the advantages of single-system file systems to high availability clusters," Oct. 2002, pp. 1-16.

Tim Read et al., "Robust Clustering: A Comparison of Sun™ Cluster 3.0 versus Sun Cluster 2.2 Software," Sun BluePrints™OnLine-Sep. 2001, pp. 1-23.

Microsoft Corporation, "Microsoft® Windows2000 Advanced Server, Windows 2000 Clustering Technologies: Cluster Service Architecture," 2000, 27 pages.

Sun® Microsystems, Inc., "The Sun Enterprise Cluster Architecture, Technical White Paper," 1997, pp. 1-74.

US 7,096,213 B2

PERSISTENT KEY-VALUE REPOSITORY WITH A PLUGGABLE ARCHITECTURE TO ABSTRACT PHYSICAL STORAGE

RELATED APPLICATIONS

The present application claims priority to the following provisional U.S. patent applications, the entire contents of which are incorporated herein for all purposes:

U.S. Provisional Patent Application No. 60/370,963 entitled "Personalized Content Within a Global Namespace", filed Apr. 8, 2002; and U.S. Provisional Patent Application No. 60/372,186 entitled "Approach for Personalized Content Within a Global Namespace", filed Apr. 12, 2002.

The present application is also related to the following non-provisional U.S. patent applications:

U.S. patent application Ser. No. 10/304,449 entitled "Mechanism for Creating Member Private Data in a Global Namespace" filed on Nov. 25, 2002 by Surojit Chatterjee and Alok K. Srivastava;

U.S. patent application Ser. No. 10/308,809 entitled "Metadata Format for Hierarchical Data Storage on a Raw Storage Device" filed on Dec. 2, 2002 by Surojit Chatterjee and Alok K. Srivastava; and U.S. patent application Ser. No. 10/232,907 entitled "Use of Dynamic Multi-Level Hash Table for Managing Hierarchically Structured Information" filed on Aug. 30, 2002, by Surojit Chatterjee and Sameer Joshi.

FIELD OF THE INVENTION

The present invention relates to data repositories and, more specifically, to repositories for storing key-value pairs.

BACKGROUND OF THE INVENTION

Many types of information are commonly stored in the form of key-value pairs, where the "key" portion of the pair is a label, and the "value" portion of the pair provides a value associated with the label. For example, information about the configuration of a computer system may include the following key-value pair: ("memory", 512M) to indicate that the amount of dynamic memory in the computer system is 512 megabytes.

Typically, a software program or system that needs to store large amounts of key-value pairs will include a repository for storing the information, and include logic for managing the repository. When such repositories are used for storing configuration data, the repositories are often referred to as registries.

When each program or system that requires a key-value pair repository implements and manages its own repository, the result is a proliferation of proprietary repositories and a massive duplication of work. To address this problem, key-value pair repository designers can expose an application programming interface (API) to their repository to allow certain third-party applications to make use of their repository. For example, an operating system may allow third-party applications designed for the operating system to store key-value pairs in the repository that is managed by the operating system.

Unfortunately, such "open" repositories do not provide a general solution because they are typically tied to a specific platform or storage subsystem, and are therefore not portable or useable as general-purpose key-value pair repositories. Because they are designed using certain assumptions about the environment and platform in which they will be used, they are generally not available for use by applications or systems that do not conform to those assumptions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and system for providing cluster-wide access to a shared, key-value pair repository is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided for managing key-value pairs using an architecture that does not restrict its users to any specific platform or storage subsystem. According to one aspect, the repository is portable in that the architecture need not change based on the environment and platform in which the repository is used. Rather, the portion of the architecture that is platform-specific is limited to plug-ins at a storage abstraction layer of the repository. Each of the plug-ins exposes the same storage abstraction interface to the other layers of the repository, but is implemented to interact with a different platform or storage subsystem than the other plug-ins.

In addition, the pluggable nature of the architecture results in cross-platform portability. For example, the repository may be used on any number of popular Operating System/Hardware combinations, such as Solaris/Sun, AIX/IBM, HPUX/HP, Windows/Dell, etc. Consequently, in response to being ported from one platform to another, the repository may simply change the plug-in to invoke for persistent storage operations.

According to one aspect, performance of the repository is enhanced by maintaining a master cache of key-value pair information, and local caches of key-value pair information. According to one embodiment, a single local cache is managed on each node, where the client associated with the cache on any given node is not dictated by the repository. For example, the cache for a node may be associated with the client on that node that will most heavily use the repository, by causing that client to make the appropriate calls to the repository.

System Overview

Figure 1:
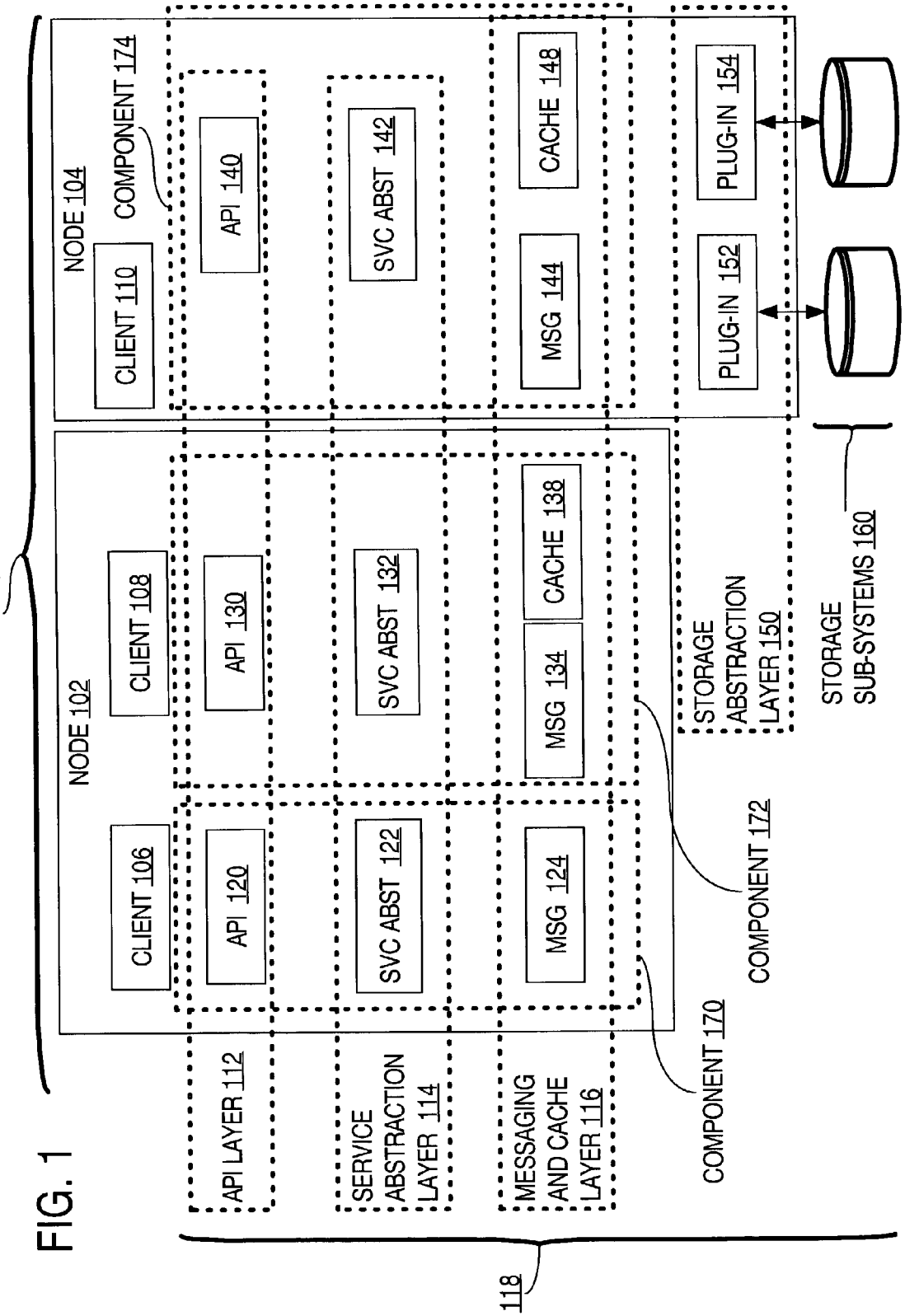
FIG. 1 is a block diagram of a key-value pair repository according to an embodiment of the invention.

Referring to FIG. 1, it is a block diagram illustrating a system for providing cluster-wide access to a shared, key-value pair repository 118, according to an embodiment of the invention. Specifically, FIG. 1 illustrates a cluster 100 that includes two nodes 102 and 104. A two-node cluster embodiment is shown to simplify the description of the system. However, the invention and techniques described herein are not limited to clusters having any particular number of nodes.

The term "cluster" is used herein to refer to any set of nodes that are able to communicate with each other. A cluster may include, for example, a group of networked computers. In some situations, clusters are managed as a unit by cluster management software. Cluster management software is an example of a software system that could make use of key-value pair repository 118. Specifically, cluster management software may use key-value pair repository 118 as a cluster registry, to store information about the configuration of the cluster that is managed by the cluster management software. It should be noted, however, that cluster management software is merely one example of a client that might make use of repository 118. The present invention is not limited to any particular type of client. Rather, in many situations, numerous disparate types of clients will use repository 118.

Referring again to FIG. 1, node 102 includes two clients 106, 108 of repository 118, while node 104 includes one client 110 of repository 118. Clients 106, 108 and 110 are referred to as "clients" because they request services of the repository 118 in order to manage the key-value pairs in which they are interested. Clients 106, 108 and 110 generally represent any form of software program that requires storage of key-value pairs, and are not limited to any particular type of software program.

In the embodiment illustrated in FIG. 1, repository 118 includes several layers of functionality. Specifically, repository 118 includes an API layer 112, a service abstraction layer 114, a messaging and cache layer 116, a storage abstraction layer 150, and storage subsystems 160. In general, API layer 112 presents a common interface to all clients 106, 108 and 110 through which clients can make calls to store, access and manage key-value pairs in repository 118. As shall be described in greater detail hereafter, routines within API layer 112 expose to clients 106, 108 and 110 an interface that is independent of the actual storage subsystem 160 that is ultimately used to durably store the key-value pairs.

Service abstraction layer 114 includes routines that determine how to process calls received by the routines at API layer 112. Messaging and cache layer 116 includes routines that may be called by components of repository 118 to communicate with other components of repository 118. In addition, messaging and cache layer 116 includes routines for managing a cache of key-value pairs, so that all requests made by a client do not result in accesses to storage subsystems 160.

Storage abstraction layer 150 includes plug-ins 152 and 154. Each plug-in exposes the same storage access API to the routines in layers 114 and 116. However, the routines that implement the common storage API differ from plug-in to plug-in based on the type of storage subsystem associated with the plug-in. Storage subsystems 160 represent any form of durable storage system that is able to store key-value pairs.

Each of these layers shall be described in greater detail hereafter.

Master and Caching Components

According to one embodiment, one component of repository 118 is designated as the master component. The routines in the messaging and cache layer 116 of the master component have exclusive access to the storage abstraction layer 150. The master component also manages a master cache of information from repository 118. In the embodiment illustrated in FIG. 1, component 174 is the master component. Consequently, the routines in the messaging and cache layer 116 of component 174 manage a master cache 148, and have exclusive access to plug-ins 152 and 154 that reside at the storage abstraction layer 150.

Each node in the cluster also includes a single "caching component". The caching component for a node maintains a cache of information from the repository 118. The client associated with the caching component is referred to herein as the "caching-level client". According to one embodiment, the master component is the caching component for the node on which the master component resides.

In the illustrated embodiment, component 172 is the caching component for node 102, and as such manages a cache 138. Client 108, which is associated with component 172, is the caching-level client for node 102. Component 170, which also resides on node 102, is not a caching component and therefore does not maintain its own cache of information from repository 118.

According to one embodiment, a client establishes its associated component as a caching component based on information passed to repository 118 through calls made by the client to routines in API layer 112. For example, client 108 may establish itself as the caching-level client for node 102 by making the appropriate call into API 130. The call may pass to API 130 a value that indicates that component 172 is to be the caching component for node 102.

Because the caching-level client generally has faster access to the cache managed by the caching component, it is preferable for the caching-level client on the particular node to be the client that uses the repository 118 most heavily. For example, client 106 and client 108 may represent two different kinds of clients, where client 108 makes heavy use of repository 118 and client 106 uses repository 118 rarely. Under these circumstances, client 108 would be selected as the caching level client. Client 108 could then be designed to make the appropriate calls to component 172 to cause component 172 to be the caching component for node 102.

According to an alternative embodiment, the actual repository use of clients on node 102 may be monitored, and the component that is using repository 118 most heavily may be dynamically selected as the caching component. In such an embodiment, routines may even be provided for dynamically passing the caching responsibility from one component to another, based on the changing access patterns of the clients that are associated with the components.

Various techniques may be used to manage the cache when write operations are performed against the repository. For example, one embodiment may use a "write-through" approach to maintaining the cache during write operations. The present invention is not limited to any particular approach to managing caches during write operations.

In the embodiment illustrated in FIG. 1, cluster 100 has a single master component 174 with rights to interact with storage abstraction layer 150. Because abstraction layer 150 is accessed from a single master component 174, various problems associated with resource sharing and concurrency control may be avoided. However, alternative embodiments may include a plurality of master components with rights to directly interact with storage abstraction layer 150. Various concurrency control techniques may be used to avoid potentially harmful interactions in such a system. For example, the namespace of the keys may be partitioned, where each master component is assigned one of the namespace partitions. Under such an embodiment, each master component may be allowed to access storage abstraction layer 150 only for operations involving keys that fall within the namespace partition assigned to the master component.

The API Layer

Clients that wish to use repository 118 to manage key-value pairs do so by making calls to routines in API layer 112. According to one embodiment, the routines in API layer 112 expose interfaces for all operations supported by repository 118. In one embodiment, the routines in API layer 112 perform parameter validation and error checking. If calls made to the routines in API layer 112 pass the tests performed at API layer 112, then the calls are passed down to the appropriate routines in the service abstraction layer 114.

The routines of API layer 112 may be provided to the developers of such clients in the form of a code library. The developers may then include, in their clients, code that makes calls to the routines in the code library. The code library may then be statically linked with the client code at the time the client code is compiled, or dynamically linked to the client code at runtime.

According to one embodiment, the interface exposed by API layer 112 may include interfaces for multiple programming languages. For example, API layer 112 may expose both a JAVA API for use by clients written in or compatible with the JAVA programming language, and a "C" language API for use by clients written in or compatible with the C programming language.

According to one alternative embodiment, API layer 112 exposes only a C language interface, and repository 118 includes one or more additional modules for making calls into API layer 112 based on calls received from clients written in other languages. Such modules effectively transform calls from the clients in one language to calls in the language supported by the interface exposed by API layer 112. For example, such a module may expose the JAVA-based repository API to Java-based clients, and then use JNI Wrappers to convert calls made through the JAVA-based repository API into calls made by the module into the "C" based repository interface exposed by API layer 112.

The Service Abstraction Layer

The service abstraction layer 114 determines how to process calls made from clients. A variety of factors may determine how any given call is handled. Such factors include, for example, the identity of the client making the call, the access mode applicable to the call, and the type of operation requested by the call. Access modes shall be described in greater detail below.

Depending on these factors, the routines in the service abstraction layer 114 may access a local cache, access a master cache, or make a call to a messaging routine in messaging and cache layer 116 to send a request to a different component of the repository 118. If the called routine in the service abstraction layer 114 is not in a caching component or master component, then the called routine in the service abstraction layer 114 calls a routine in the messaging and cache layer 116 to pass request on to the local caching component.

If the called routine in the service abstraction layer 114 is in a caching component, then the called routine in the service abstraction layer 114 checks the local cache to see if the cache contains information to answer the request. If the local cache does not contain information to answer the request, then the called routine in the service abstraction layer 114 calls a routine in the messaging and cache layer 116 to pass the request on to the master component.

If the called routine in the service abstraction layer 114 is in the master component, then the called routine in the service abstraction layer 114 checks the master cache to see if the cache contains information to answer the request. If the master cache does not contain information to answer the request, then the called routine in the service abstraction layer 114 calls a routine in the messaging and cache layer 116 to invoke the appropriate plug-in at the storage abstraction layer 150 to retrieve the information from durable storage on one of the storage subsystems 160.

According to one embodiment, all calls made from routines in the service abstraction layer 114 to messaging routines in messaging and cache layer 116 are stateless. In such an embodiment, each message that the service abstraction layer 114 sends through messaging routines within the messaging and cache layer 116 contains all the necessary information to perform the desired operation.

According to one embodiment, routines in the service abstraction layer 114 of caching components and the master component have the responsibility of authenticating clients. During the authentication operation, the routines determine whether or not the client is "trusted". Clients that are not "trusted" are not allowed to perform certain types of operations.

The Messaging and Cache Layer

The messaging and cache layer 116 includes routines for accessing and managing a cache, and routines for communicating with other components of repository 118. According to one embodiment, the caching routines are only used by one component in each node. Other components on the node use the cache indirectly by forwarding requests to the component that is managing the cache.

According to one embodiment, how a caching routine satisfies a request is completely transparent to the routine that calls a caching routine. Specifically, upon receiving the request, the caching routine checks the cache that it manages. If the cache contains the information required to satisfy the request, then the caching routine retrieves the information from the cache and provides the information to the calling routine. However, if the cache does not contain the information required to satisfy the request, then the caching routine obtains the required information by other means. For example, if the caching routine belongs to a caching component, then the caching routine may call a messaging routine to request the required information from the master component. If the caching routine belongs to the master component, then the caching routine may call the appropriate storage abstraction layer plug-in to retrieve the requested information from a storage subsystem. The caching routine may cause the information to be stored in the cache that it manages, in addition to providing the requested information back to the calling routine.

According to one embodiment, the messaging routines in the messaging and cache layer 116 are configured to send requests in network byte order, at least when the messages must traverse a platform boundary within a cluster. For example, assume that node 102 is running on a first platform, and node 104 is running a second platform. In such a scenario, the messaging routines in node 102 send messages to the messaging routines on node 104 in network byte order. Similarly, the messaging routines on node 104 send messages to the messaging routines on node 102 in network byte order. By sending messages across platform boundaries in network byte order, the messages sent by senders can be accurately reconstructed by recipients that reside on different platforms than the senders.

The Storage Abstraction Layer

According to one embodiment, routines provided in the storage abstraction layer 150 completely abstract what kind of backend storage is being used to durably store the key-value pair information managed by repository 118. For example, both plug-in 152 and plug-in 154 expose an identical interface to the caching routines in messaging and cache layer 116 of the master component 174, even though plug-in 152 may be designed to operate with a completely different storage subsystem than plug-in 154. While plug-ins 152 and 154 expose the same interface to the caching routines, the logic of the routines that implement the interface may be completely different, based on what kind of backend storage the plug-in is designed to interact with.

Significantly, because all of the platform-specific logic is contained in the plug-ins at the storage abstraction layer 150, the routines at all other layers of repository 118 are not platform-specific or storage subsystem specific. Consequently, clients that use repository 118 are effectively insulated from platform-specific design details, making both the clients and the upper-layer components of repository 118 portable across platforms.

Because storage abstraction layer 150 is implemented using one or more plug-ins that expose a common interface, repository 118 is not limited to any particular backend subsystem or platform. Any subsystem or platform capable of providing the functionality associated with the exposed common interface may be used. Such backend platforms may include, but are not limited to, LDAP, MSCS, shared raw devices, raw devices and/or private file system files within a shared-nothing cluster, Cluster File Systems (CFS) and distributed configuration repositories.

When repository 118 is requested to perform an operation that requires access to key-value pairs on persistent storage, a call is made (typically from a caching routine in the messaging and cache layer of the master component) to storage abstraction layer 150. According to one embodiment, repository 118 selects the specific plug-in to call based on one or more of a variety of possible factors. For example, repository 118 may include an environment variable whose value may be set by an administrator, where the value of the environment variable indicates which type of storage subsystem is to be used for persistently storing the data managed by repository 118. Alternatively, repository 118 may include discovery logic that detects which storage subsystems are available to a particular installation of repository 118. If only one type of subsystem is available, then the plug-in associated with that type of subsystem is selected. If several types are available, then repository 118 may select among the available types based on various other considerations. These considerations may include but are not limited to storage capacity or available free space in the storage subsystems 160. Once selected, the appropriate plug-in may be dynamically loaded into volatile memory, and routines within the plug-in may be called.

Because each plug-in is designed to interact with a different type of backend storage system, the selection of the plug-in determines the nature of the back-end platform on which the key-value pairs managed by the repository 118 are persistently stored. For example, if the target key-value pairs are to be located on a shared storage device, a routine in plug-in 152 may be called. If the target key-value pairs are to be managed within a storage subsystem managed by an LDAP server, then a corresponding routine in plug-in 154 may be called. According to one embodiment, the called routine name, and the parameters of the call, are the same in both instances, because the interfaces exposed by plug-ins 152 and 154 are identical, thereby making the nature of the storage-subsystems 160 transparent to clients 106, 108, and 110 and routines in the upper layers of repository 118.

The interface exposed by the storage abstraction layer 150 allows processes external to the storage abstraction layer 150 to make calls through the interface to routines in the storage abstraction layer 150 to perform the various functions required of repository 118. In one embodiment, repository 118 supports node-dependent keys. Specifically, multiple clients (clients 106 and 108 on node 102, and client 110 on node 104) of repository 118 may each want to store a key-value pair, where the key name used by each client is the same, but the value used by each client on different nodes for that key name may be different. For example, each client may want to store the key-value pair "backgroundcolor"=X, where X may be any one of blue, green or purple. Using node-dependent keys, repository 118 will separately store the values for "backgroundcolor" for each client, depending upon the node on which the client happens to be running. For the current example, clients 106 and 108 on node 102 will see the same value for the backgroundcolor key, but the client 110 on node 104 will see a different value for the same backgroundcolor key.

Exemplary Request Sequence

According to one embodiment, requests for information managed by repository 118 are processed by first checking the cache that resides on the same node as the requester. If the information is not in the local node cache, then the master cache is checked. If the information is not in the master cache, then a call is made to the storage abstraction layer 150 to retrieve the information from durable storage.

For example, assume that client 106 requires a certain key-value pair that is managed by repository 118, and that does not currently reside in any cache. According to one embodiment, the operation of retrieving that key-value pair for client 106 would proceed as follows:

Initially, client 106 calls a routine (API 120) in the API layer 112 to request a read of the desired key-value pair. API 120 sends the request to a routine (SVC ABST 122) in the service abstraction layer 114. SVC ABST 122 determines how to handle the request. In the present example, SVC ABST 122 determines that the request should be forwarded to the cache that is local to node 102. Since component 170 is not the caching component of node 102, forwarding the request to the cache involves component 170 communicating with another component 172. To accomplish this communication, the request is passed to a routine (MSG 124) in the messaging and cache layer 116 of component 170.

MSG 124 communicates the request to a routine (MSG 134) at the messaging and cache layer 116 of caching component 172. MSG 134 passes the request up to a routine (SVC ABST 132) in the service abstraction layer 114 of caching component 172. SVC ABST 132 determines that cache 138 should be inspected to determine whether it contains the requested information. SVC ABST 132 makes the appropriate call to a routine in the messaging and cache layer 116.

When the information is not found in the local cache 138, a message is sent from MSG 134 to a routine (MSG 144) in the messaging and cache layer 116 of the master component 174. MSG 144 passes the request up to a routine (SVC ABST 142) in the service abstraction layer 114 of master component 174. SVC ABST 142 determines that master cache 148 should be inspected to determine whether it contains the requested information. SVC ABST 142 makes the appropriate call to a routine in the messaging and cache layer 116.

When the information is not found in the master cache 148, a message is sent to the appropriate plug-in (e.g. plug-in 152) at the storage abstraction layer 150. The plug-in 152 causes the requested information to be retrieved into cache 148 from persistent storage on one of storage subsystems 160. MSG 144 then returns the call from MSG 134 by passing back the requested information. MSG 134 causes the information to be stored in cache 138, and returns the call from MSG 124 by passing back the requested information.

MSG 124 passes the information back to SVC ABST 122, which in turn passes the information back to API 120. Finally, API 120 delivers the requested information to client 106.

Because the requested information was stored in cache 138, subsequent requests for the same information by any clients on node 102 may be handled by retrieving the data from cache 138. Because the requested information was stored in master cache 148, subsequent requests for the same information by clients on nodes that do not have the information cached locally may be handled by retrieving the data from master cache 148.

Access Modes

According to one embodiment, the routines provided at the API layer 112 may be accessed in any one of four access modes. A client may indicate a particular access mode to a routine in the API layer 112 by, for example, passing to the routine a parameter value that indicates the mode. Rather than pass such a parameter with each call to the API layer 112, the first call made by a client to the API layer 112 may specify the desired mode to an "initialization routine". The initialization routine may pass a handle back to the client, which the client then uses to make all future calls to API layer 112. The handle may be associated with data that indicates the access mode of the client. Consequently, passing the handle in all subsequent calls effectively informs the routines that process the subsequent calls about the access mode that should be used in servicing those calls.

According to one embodiment, different modules of the same client may access repository 118 in different access modes. For example, a first module within client 108 may access repository 118 in read-only mode, while another module within client 108 accesses repository 118 in caching access mode. Similarly, a client may transition from one access mode to another access mode by making the appropriate calls into API layer 112.

The access mode that a particular client requests is dictated by the role of the client and/or the type of operation that the client intends to perform. According to one embodiment, the modes supported by repository 118 include an installation mode, a read-only access mode, a caching access mode, and a default access mode.

Installation mode: installation mode is the mode used by a client (typically a repository installation program) to perform the operations of creating or re-creating a repository. According to one embodiment, installation mode can be held by only one client at a time, and excludes all other clients from performing any repository operations.

Read-only access mode: by requesting read-only access mode, a client indicates that it will only be performing read-only operations. When performing operations for a client in read-only access mode, all of the concurrency control logic within repository 118 is disabled/circumvented. Consequently, operations can generally be performed faster, and with less overhead, than if performed in modes that allow write operations. Read-only access mode may be concurrently shared by multiple clients, since read operations do not generally cause access conflicts with other read operations.

According to one embodiment, repository 118 uses cluster configuration software to perform some of the concurrency control during operations within repository 118. Such cluster configuration software may also use repository 118 to store boot-up information for cluster 100. In such an embodiment, the cluster configuration software uses read-only access mode to access the cluster configuration information while cluster 100 is being booted up, to ensure that the concurrency control routines of the cluster configuration software will not be executed until the cluster configuration software is itself fully initialized.

Caching access mode: caching access mode is the mode used by a client to establish the component used by the client as the caching component for a node. For example, component 172 is established as the caching component of node 102 in response to client 108 initializing component 172 in caching access mode. When client 108 makes a call to initialize component 172, resources may be allocated for cache 138. When read operations are performed in caching access mode, the routines within service abstraction layer 114 invoke caching routines in messaging and cache layer 116 to search for required information within cache 138.

Default access mode: default access mode is the mode used by clients that (1) are not associated with the caching component, and (2) are not performing an operation that requires installation or read-only access modes. When performing operations in default access mode, routines in the service abstraction layer 114 use messaging routines in messaging and cache layer 116 to forward read requests to the local caching component.

According to one embodiment, clients are able to transition from one mode to another. Such a transition may be initiated, for example, by passing a different access mode parameter value in subsequent calls to routines in the API layer that was passed in previous calls to routines in the API layer. According to yet another embodiment, different threads or modules of a single client process may use different access modes. For example, all calls in a first module of a client may pass one access mode value to API layer routines to obtain one access mode, while all calls in a second module of the same client may pass a different access mode value to the API layer routines to obtain a different access mode.

Hardware Overview

Figure 2:
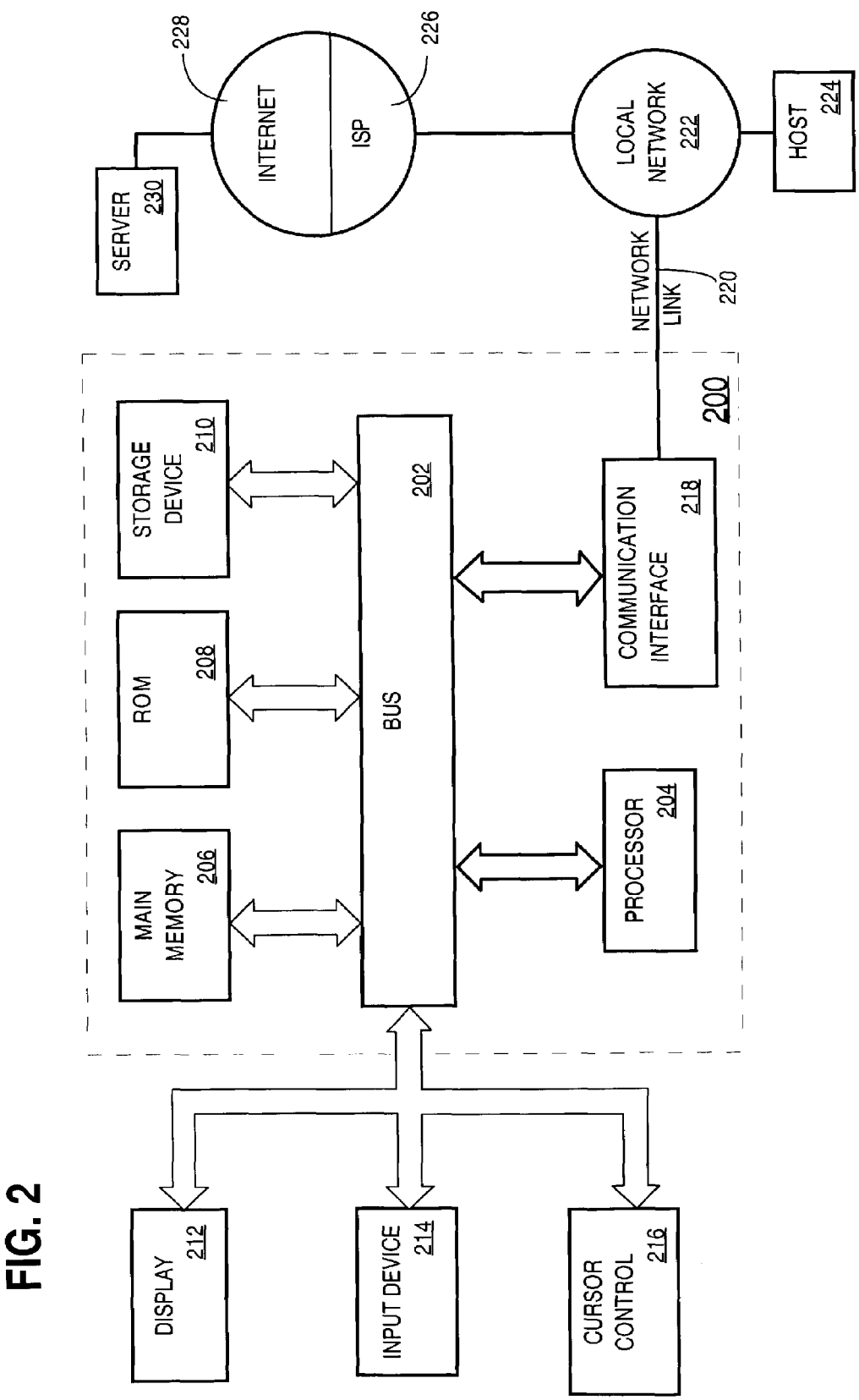
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

The term "computer-readable storage medium" as used herein is limited to include only volatile and non-volatile mediums as previously disclosed.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for storing key-value pairs, the method comprising:

exposing, at an application programming layer, a repository interface through which clients may make calls to store and access key-value pair information in a repository;

receiving, through said repository interface, at a first component on a first node, from a client on the first node, a request to perform an operation, wherein the first component is associated with the first client;

in response to receiving the request at the first component, determining whether the first component has been designated as a caching component for the first node;

in response to determining that the first component has not been designated as a caching component for the first node, determining whether a second component on the first node has been designated as a caching component for the first node, wherein the second component is associated with a second client on the first node;

in response to determining that the second component has been designated as a caching component for the first node, determining, at the second component, whether information required by said request is contained in a local cache on the first node;

in response to determining that the information required by said request is not contained in the local cache on the first node, determining whether a third component on a second node has been designated as a master component, wherein the second node is separate from the first node, wherein the third component is associated with a third client on the second node;

in response to determining that the third component has been designated as the master component, performing the following steps at the third component:

servicing calls made through said repository interface by calling one of a plurality of plug-ins through a common interface of a storage abstraction layer;

determining which particular plug-in of said plurality of plug-ins corresponds to a type of storage subsystem to access during execution of said operation;

dynamically loading the particular plug-in that corresponds to said type of storage subsystem; and performing said operation by making one or more calls through said common interface to said particular plug-in;

wherein each plug-in of said plurality of plug-ins exposes said common interface for accessing durably stored key-value pair information;

wherein each plug-in of said plurality of plug-ins is designed to interact with a particular type of storage subsystem in response to calls made through said common interface; and wherein the storage subsystem with which each plug-in interacts is a different type of storage subsystem than the storage subsystem with which each other of said plurality of plug-ins interacts.

2. The method of claim 1, further comprising the steps of:
designating the third component of said repository as the master component;

receiving, at components spread across a plurality of nodes of a cluster, calls through said repository interface from clients residing on said plurality of nodes;

directing all calls that require access to persistent storage to said master component;

wherein the master component is the only component of said repository permitted to perform the step of calling plug-ins through said common interface.

3. The method of claim 1, further comprising the steps of:
receiving a request from a client through said repository interface;

prior to making a call through said common interface for said information required by said request, search for said information in a master cache.

4. The method of claim 3, wherein:
the first client resides on the first node and the master cache resides on the second node; and
the method further comprises the step of, prior to searching for said information in said master cache, searching for said information on the local cache on said first node.

5. The method of claim 4 wherein:
the first node includes a plurality of components of said repository;
the method further comprises the steps of establishing only one component of said plurality of components as the caching component; and
if said first component is not said caching component, then causing a message to be sent from said first component to said caching component to cause said caching component to search said local cache for said information.

6. The method of claim 1 further comprising the steps of:
creating a code library that contains routines that implement said repository interface;
linking said code library to client code to allow routines in said client code to use said repository by calling said routines in said code library.

7. The method of claim 1 further comprising the steps of:
receiving a call from a client through a routine that implements a portion of said repository interface; and
based on a value of a parameter in said call, determining whether to establish a component of said repository that is associated with said client as a caching component responsible for managing a cache for said repository.

8. A computer-readable storage medium carrying instructions for storing key-value pairs, the instructions comprising instructions for performing the steps of:

exposing, at an application programming layer, a repository interface through which clients may make calls to store and access key-value pair information in a repository;

receiving, through said repository interface, at a first component on a first node, from a client on the first node, a request to perform an operation, wherein the first component is associated with the first client;

in response to receiving the request at the first component, determining whether the first component has been designated as a caching component for the first node;

in response to determining that the first component has not been designated as a caching component for the first node, determining whether a second component on the first node has been designated as a caching component for the first node, wherein the second component is associated with a second client on the first node;

in response to determining that the second component has been designated as a caching component for the first node, determining, at the second component, whether information required by said request is contained in a local cache on the first node;

in response to determining that the information required by said request is not contained in the local cache on the first node, determining whether a third component on a second node has been designated as a master component, wherein the second node is separate from the first node, wherein the third component is associated with a third client on the second node;

in response to determining that the third component has been designated as the master component, performing the following steps at the third component:

servicing calls made through said repository interface by calling one of a plurality of plug-ins through a common interface of a storage abstraction layer;

determining which particular plug-in of said plurality of plug-ins corresponds to a type of storage subsystem to access during execution of said operation;

dynamically loading the particular plug-in that corresponds to said type of storage subsystem; and performing said operation by making one or more calls through said common interface to said particular plug-in;

wherein each plug-in of said plurality of plug-ins exposes said common interface for accessing durably stored key-value pair information;

wherein each plug-in of said plurality of plug-ins is designed to interact with a particular type of storage subsystem in response to calls made through said common interface; and wherein the storage subsystem with which each plug-in interacts is a different type of storage subsystem than the storage subsystem with which each other of said plurality of plug-ins interacts.

9. The computer-readable storage medium of claim 8 further comprising instructions for performing the steps of:
designating a the third component of said repository as the master component;
receiving, at components spread across a plurality of nodes of a cluster, calls through said repository interface from clients residing on said plurality of nodes;
directing all calls that require access to persistent storage to said master component;
wherein the master component is the only component of said repository permitted to perform the step of calling plug-ins through said common interface.

10. The computer-readable storage medium of claim 8 further comprising instructions for performing the steps of:

receiving a request from a client through said repository interface;
prior to making a call through said common interface for said information required by said request, searching for said information in a master cache.

11. The computer-readable storage medium of claim 10 wherein:
the first client resides on the first node and the master cache resides on the second node; and
the tangible computer-readable medium further comprises instructions for performing the step of, prior to searching for said information in said master cache, searching for said information on the local cache on said first node.

12. The computer-readable storage medium of claim 11 wherein:
the first node includes a plurality of components of said repository;
the tangible computer-readable medium further comprises instructions for performing the steps of establishing only one component of said plurality of components as the caching component; and
if said first component is not said caching component, then causing a message to be sent from said first component to said caching component to cause said caching component to search said local cache for said information.

13. The computer-readable storage medium of claim 8 further comprising instructions for performing the steps of:
creating a code library that contains routines that implement said repository interface;
linking said code library to client code to allow routines in said client code to use said repository by calling said routines in said code library.

14. The computer-readable storage medium of claim 8 further comprising instructions for performing the steps of:
receiving a call from a client through a routine that implements a portion of said repository interface; and
based on a value of a parameter in said call, determining whether to establish a component of said repository that is associated with said client as a caching component responsible for managing a cache for said repository.

* * * * *